Figure 1:
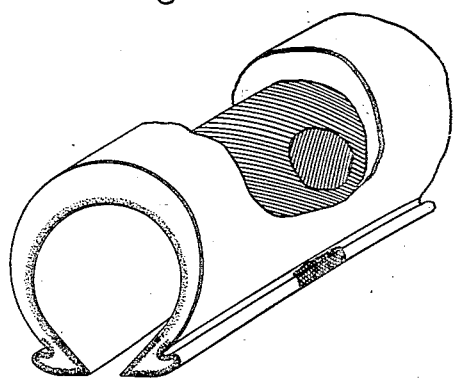

J. SKINNER.
WOVEN FABRIC.
APPLICATION FILED MAY 3, 1915.

1,196,037.

Patented Aug. 29, 1916.

Inventor.
John Skinner,
by Heard Smith & Tennant.
Atty's.

UNITED STATES PATENT OFFICE.

JOHN SKINNER, OF NORTHAMPTON, MASSACHUSETTS.

WOVEN FABRIC.

1,196,037.

Specification of Letters Patent.  Patented Aug. 29, 1916.

Application filed May 3, 1915.  Serial No. 25,397.

*To all whom it may concern:*

Be it known that I, JOHN SKINNER, a citizen of the United States, residing at Northampton, county of Hampshire, State of Massachusetts, have invented an Improvement in Woven Fabric, of which the following description, in connection with the accompanying drawing, is a specification, like characters on the drawing representing like parts.

This invention relates to a novel construction of woven fabric and its object is more fully to provide a novel and suitable form of woven fabric for use in the manufacture of composite vehicle tires such as the pneumatic rubber tires used on automobiles, motor cycles, bicycles, flying machines, etc.

More specifically the object of the invention is to provide a structure of woven fabric presenting a sheet of cords which when placed in the tire body will extend from one edge to the other through the walls of the tire in a diagonal direction, and be substantially free from interlocking engagement with each other so as to present the required strength to the tire while at the same time preserving complete elasticity.

Another object of the invention is to provide a structure of fabric securing the desired results which may be easily manufactured or woven in a continuous breadth and then separated into strips having the desired characteristics.

Another object of the invention is to provide such a structure in which the filling or weft threads forming with the warp cords the fabric at the edge portions shall be relatively small so that when strips of the fabric are superimposed the thickness of the superimposed edge portions or sections shall not be materially greater than the thickness of the superimposed sheets of cords.

These and other objects of the invention will appear more fully from the accompanying description and drawings and will be particularly pointed out in the claim.

Figure 2:
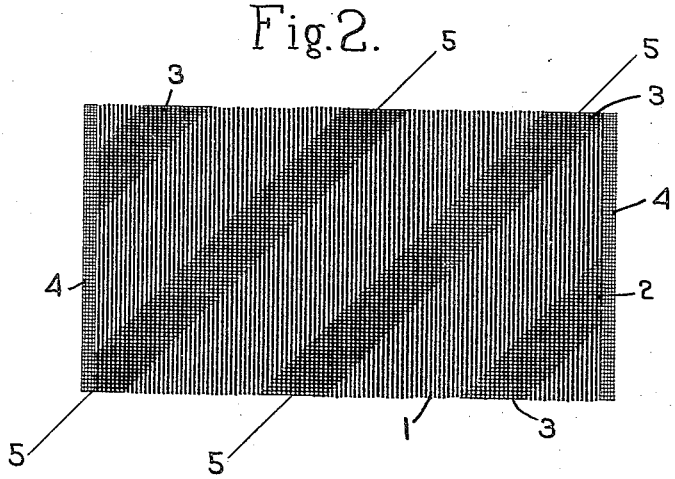
Figure 3:
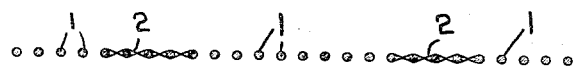

In the drawings, Figure 1 is a view in perspective of a portion of the tire broken away in part to show its construction and embodying the invention; Fig. 2 is a plan view of a breadth of the fabric embodying the invention; Fig. 3 is an enlarged diagrammatic cross-sectional detail of the construction of fabric shown in Fig. 2.

In a fabric embodying this invention as in the case of any fabric two sets of threads are used, one of which is herein referred to as the warp cords and the other as the filling threads. The warp cords are comparatively relatively large in size and of heavy twisted yarn which may be if required or found desirable impregnated with rubber or other compound. The strength and character of the warp cords is determined by the character of the tire in which they are used and the requirements of the fabric material in such tires are well known to those skilled in the art. The filling threads have the function of holding the warp cords in place and are only interwoven or interlocked with the warp cords at the edge sections or portions of the strips so that the warp cords form a sheet extending throughout the body of said tread portion of the tire and from one bead to the other. The edge sections or portions of the strip extend through the bead and are of sufficient width as to be readily embodied in the tire at the edge and as also to present a means by which the fabric may be readily handled in the manufacture of the tire while maintaining the floating warp cords in position.

The fabric is constructed by weaving a continuous breadth in any usual manner with the warp cords extending longitudinally thereof and with the filling threads extending transversely thereof. The strips of fabric are formed as zones extending diagonally of this breadth of fabric, the warp cords and filling being interwoven in alternating parallel diagonal zones and the warp cords floating freely in the intermediate zones although it is to be understood that an occasional interlocking of the freely floating warp cords is within the scope of the invention and may at times be desirable. The strips are formed by severing the fabric along the medial lines of the interwoven warp cord and fabric thread zones. Preferably these zones extend at an angle of 45° to the length of the fabric breadth and thus the resulting strips are symmetrical and reversible.

The preferred form of the fabric embodying the invention is illustrated in Figs. 2 and 3. Therein the warp cords 1 are shown as comprising a sheet of the width of the fabric breadth and extending longitudinally of its length in the usual manner. The filling threads 2 extend transversely of the fabric or at right angles to the warps. The warp cords and filling threads are interwoven in parallel zones 3 which extend diagonally across the fabric and preferably, as already stated, at an angle of 45° to the warp cords and filling threads. The warp cords and filling threads are also preferably interwoven along narrow selvages 4—4. The interweaving of the warp cords and filling threads with each other in the zones 3 and at the selvages 4 may be performed by any suitable loom or other weaving instrumentality, and as such devices are well known and familiar and are provided with jacquard mechanism and various other means for securing the interweaving of warp and filling at required points, and as the weaving instrumentalities form no part of the present invention it will be unnecessary here to describe them. The filling threads may extend throughout the width of the fabric breadth and be cut away or removed between the diagonal zones 3 if desired. The dimensions of the fabric and the width and positions of the zones 3 will depend upon the particular requirements and may obviously be varied as desired. The warp cords as stated are relatively large and heavy while the filling threads are relatively small and fine. The warp cords or the entire fabric may be impregnated with rubber or other compound as desired. The distance between and normal to the medial lines 5—5 of the zones 3 will be equal to the width required for a strip of fabric to be embodied in the tire and the width of the entire breadth of fabric will be as great as convenient because upon it depends the length of the strips. It will thus be seen that the fabric woven as described may be cut into strips by severance along the medial lines 5 of each zone. Each strip will then present interwoven edge sections with floating warp cords extending between the sections. Preferably as illustrated the warp cords extend at an angle of 45° to the edges of the strips and as thus the warp cords and filling threads run at right angles to each other a symmetrical and reversible arrangement is presented. Owing to the fact that the filling threads are relatively small the interwoven edge sections are in thickness not materially different from the intermediate sheet of warp cords so that when two or more strips of the fabric are superimposed the superimposed edge sections are not materially thicker than the superimposed medial portions of free warp cords. This enables two or more strips of the fabric to be embedded in the tire without producing an undue thickness at the edge or bead portion of the tire.

When the strips of fabric are placed in the tire they are placed so that the floating warp cords run and cross each other in opposite directions and with the angle of the warp cords at 45° they will cross each other at right angles. This is the construction illustrated in Fig. 1.

There is thus produced a fabric which is peculiarly suitable for the manufacture of these composite tires. Great strength is secured in the fabric where it is embedded in or secured to the bead and a ready means is provided by the interwoven edge sections for the handling and positioning of the fabric during the manufacture of the tire. The sheets of floating warp cords extending diagonally through the body of the tire give a maximum of strength to the wall portion and since they are unconfined do not detract from the flexibility or elasticity of the tire.

Having fully described my invention, what I claim as new and desire to secure by Letters Patent is:

A woven fabric comprising a sheet of warp cords, relatively small filling threads interwoven with said warp cords in parallel zones which extend diagonally of said warp cords with the warp cords floating between said zones whereby the fabric may be separated by severance along a medial line of each of said zones into strips having interwoven edge sections with floating warp cords extending therebetween and diagonally thereto which strips by reason of the relatively small size of the filling threads may be superimposed without presenting a materially greater total thickness at the edge sections than at the medial sections.

In testimony whereof, I have signed my name to this specification.

JOHN SKINNER.